United States Patent [19]
Dunn

[11] 3,876,013
[45] Apr. 8, 1975

[54] SELF-LEVELING ROTARY SCREW GRADER

[76] Inventor: Charles William Dunn, 1217 S. 1st St., Lovington, N. Mex.

[22] Filed: Nov. 16, 1972

[21] Appl. No.: 307,133

Related U.S. Application Data
[63] Substitute for Ser. No. 883,846, Dec. 10, 1969, abandoned.

[52] U.S. Cl. ............... 172/71; 172/63; 172/119; 172/150; 172/170; 172/448
[51] Int. Cl. ............... A01b 49/02; A01b 33/02
[58] Field of Search ............ 172/47, 48, 50, 66, 71, 172/82, 118, 119, 143, 145, 149, 150, 170, 114, 532, 549, 63

[56] References Cited
UNITED STATES PATENTS

| | | | |
|---|---|---|---|
| 395,602 | 1/1889 | Watson et al. | 172/145 X |
| 2,280,846 | 4/1942 | Pitcher | 172/119 X |
| 2,309,750 | 2/1943 | Carrington | 172/448 |
| 2,342,031 | 2/1944 | Bagan | 172/119 X |
| 2,379,469 | 7/1945 | Bagan | 172/119 |
| 2,841,067 | 7/1958 | Magarian | 172/448 |
| 2,881,847 | 4/1959 | Strasel | 172/549 |
| 2,886,906 | 5/1959 | Moses | 172/150 |
| 3,362,092 | 1/1968 | Spetcher et al. | 172/71 X |
| 3,375,878 | 4/1968 | Dorn | 172/71 |
| 3,508,617 | 4/1970 | Paynter | 172/71 |

FOREIGN PATENTS OR APPLICATIONS
548,857   11/1922   France ................. 172/145

*Primary Examiner*—Robert E. Pulfrey
*Assistant Examiner*—R. T. Rader
*Attorney, Agent, or Firm*—Pastoriza & Kelly

[57] ABSTRACT

An earth moving and leveling grader capable of being hitched to and pulled by a self-propelled vehicle such as a tractor, includes a rigid frame that mounts a rotary screw conveyor at its forward section and a roller at its rearward section. The rotary screw conveyor is operatively connected to a tractor power take-off shaft.

The rigid frame is detachably coupled to the tractor by a force transmitting framework connected to a depth cutting adjustment means. When the depth cutting adjustment means is actuated then resulting deformation or reshaping of the force transmitting framework causes the roller to serve as a fulcrum in order to selectively urge the rotary screw to a shallower or deeper cutting depth. When a new cutting depth is attained then the roller, due to its connection with the rotary screw conveyor through the rigid frame and force transmitting framework, will tend to maintain the rotary screw conveyer on the desired cutting level even when it encounters earth depressions and other terrain irregularities.

5 Claims, 5 Drawing Figures

INVENTOR:
CHARLES WILLIAM DUNN
BY
Pastoriza & Kelly
ATTORNEYS

INVENTOR:
CHARLES WILLIAM DUNN

BY

Pastoriza & Kelly
ATTORNEYS

SELF-LEVELING ROTARY SCREW GRADER

BACKGROUND OF THE INVENTION

This invention relates to earth moving and grading equipment and more specifically to a rotary screw conveyer for cutting and moving earth laterally, combined in such a manner with a trailing roller and a framework that the roller can be used as a fulcrum to urge the screw conveyer to different cutting levels.

The concept of using a rotary screw or auger conveyer for auxiliary earth moving purposes is known as demonstrated in U.S. Pat. No. 3,091,873 to West granted in 1963 wherein the screw conveyer operates to loosen earth and convey the resulting earth accumulations to one side. The screw conveyer is mounted on and is oriented in front of a bulldozer blade in order to laterally remove some of the earth so that the earth moving burden on the blade is somewhat relieved.

Soil pulverizing and tilling machines for breaking up ground and leaving it in place are known wherein a rotary soil pulverizing is aligned tandemly with a pressure roller. This type of device is shown in U.S. Pat. No. 1,171,010 to Von Meyenburg granted in 1916 and U.S. Pat. No. 1,509,652 to Johnson granted in 1924. The roller height can ordinarily be adjusted manually.

As shall be fully described the grader of this invention has a rigid frame that carries a rotary screw tandemly aligned with a roller wherein the roller can be used as a fulcrum in moving the rotary screw to a new selected cutting depth.

BRIEF SUMMARY OF THE INVENTION

Briefly stated this invention comprehends an efficient, reliable, self-leveling and easily operated grader capable of being pulled by a self-propelled vehicle in order to cut earth to a selected level and remove it sideways of the path of travel.

The grader has a rigid frame that mounts a rotary screw conveyer at its front section and a roller at its rear section. The axes of the rotary screw conveyer and roller are parallel with one another and aligned generally perpendicular to the longitudinal axis of the rigid frame which coincides with the direction of movement. Power means is arranged for operating the rotary screw and causing it to convey earth laterally to one side of the rigid frame and a depth cutting adjustment means is arranged for selectively controlling the depth of the rotary screw. The roller is structurally arranged to serve as a fulcrum for urging the rotary screw to a new cutting level when the depth cutting adjustment means is actuated and to thereafter serve as a level maintaining follower when the new depth is attained.

A force transmitting framework is coupled to the depth cutting adjustment means and is arranged to interconnect the rigid frame with the vehicle. Upon actuation of depth control adjustment means the force transmitting framework experiences deformation in order to cause the roller to serve as the fulcrum in urging the rotary screw to its new selected depth. Preferably the force transmitting framework includes a variable length bar coupled to the depth cutting adjustment means in such a manner that as the bar is extended the rotary screw is moved to a shallower cutting depth and as the bar is shortened the rotary screw is moved to a new deeper cutting depth. The depth cutting adjustment means may be a double acting fluid cylinder. The force transmitting framework has first and second upwardly converging diagonal bars pivoted by their lower ends to corresponding bars extending forwardly from the rigid frame in order to constitute first and second pin joints. A third bar which is preferably the variable length bar is pivoted at one end to the rigid frame and to both the first and second bars at its other end in order to constitute a third pin joint. Three hitch arms extend forwardly from the first, second and third pin joints for coupling the grader to the self-propelled vehicle.

Preferably the power means for operating the rotary screw, when used behind a pulling vehicle, includes a power take-off shaft of the vehicle that is coupled through a gear box and two intermediate shafts to the rotary screw. In order to pitch excess accumulations of earth forwardly into the path of the rotary screw the power means operates to move the rotary screw in a direction opposite from the rotational direction of the roller.

The rigid frame includes a hood enclosing a top and rearward portion of the rotary screw. A lower and rearward section of the hood adjustably mounts a leveling blade whose lower edge lies in the same horizontal plane as the bottom flight of the rotary screw.

An accessory for the grader is a scraper blade pivotally connected to the rigid frame that is movable to a position spanning a rearward section of the roller for scraping earth and debris from the roller. A cutting bar is secured to and extends rearwardly from the scraper blade so that when the rigid frame is backing up or pushed in a reverse direction the scraper and cutting blade coact to constitute an earth moving surface analogous to a small bulldozer blade.

In order to permit the grader to form berms of a certain shape or sloped levels a tilt adjusting means is coupled to the force transmitting framework for selectively tilting the rigid frame sideways about its longitudinal axis.

BRIEF DESCRIPTION OF THE DRAWINGS

The numerous benefits and unique aspects of the present invention will be fully understood when the following detailed description is studied in conjunction with the drawings in which.

DETAILED DESCRIPTION OF THE PREFERRED EMBODIMENT

Figure 1:
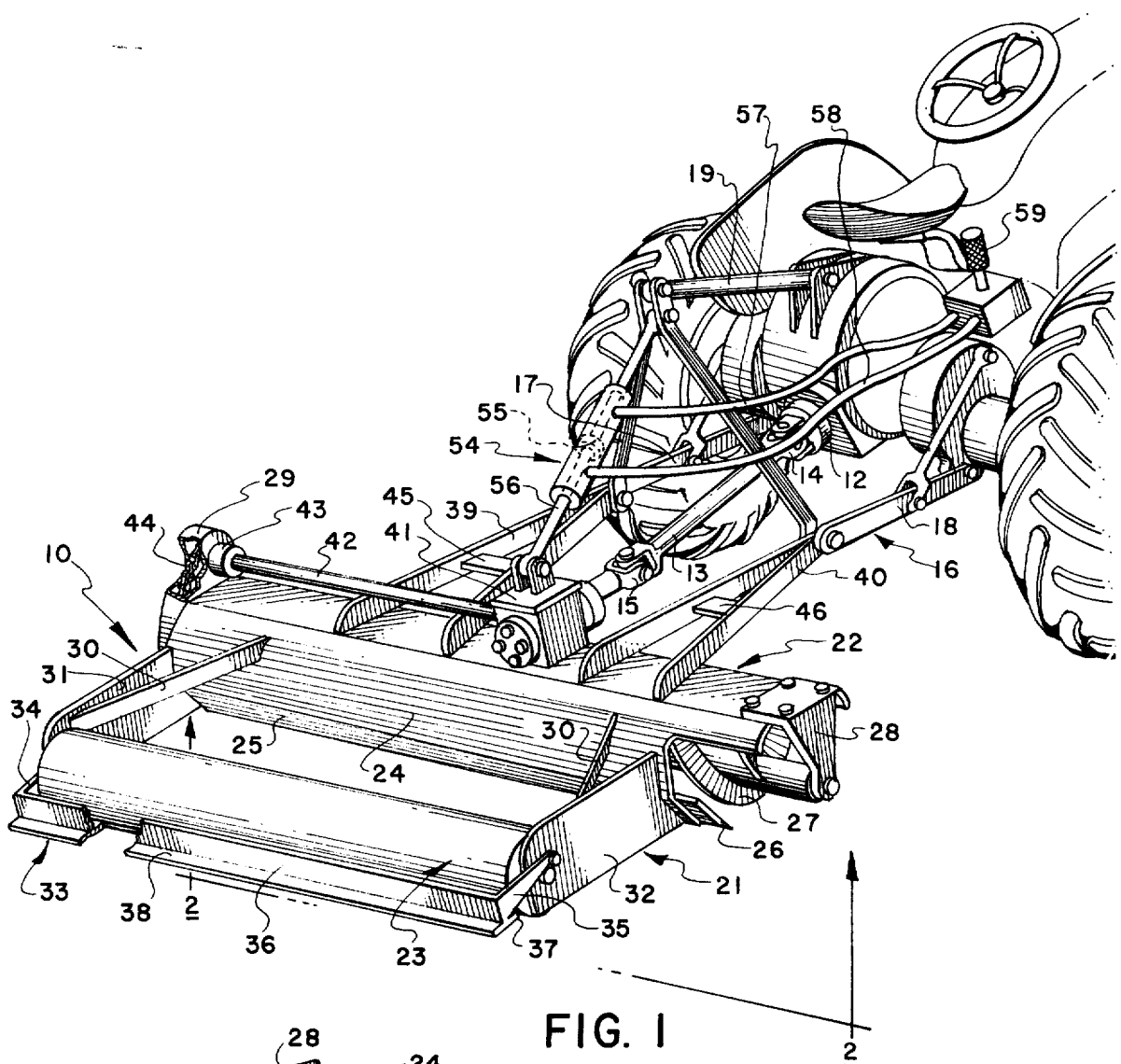
FIG. 1 is a perspective view with sections partly broken away, showing the self-leveling rotary screw grader constructed in accordance with this invention secured for operation behind the tractor.

Referring to FIG. 1 a self-leveling rotary screw grader 10 is shown hitched to and located behind a self-propelled vehicle 11 such as a conventional tractor.

The power transmission assembly of tractor 11 includes a power take-off shaft 12 drivingly engaged to a power transmission shaft 13 by way of a forward universal joint 14. Transmission shaft 13 is coupled to a component of grader 10 by a rearward universal joint 15.

Tractor 11 carries a three point hitch 16 constituted by three pivotally mounted hitch arms 17, 18 and 19. A tilt adjusting means 20 shown in FIG. 2 for selectively tilting grader 10 shall be subsequently described in detail.

The grader 10 includes a central rigid frame 21 that carries two main components, namely a rotary screw 22 and a trailing roller 23 aligned tandemly with rotary screw 22. The rotary screw 22 has a housing or hood 24 formed with a rearwardly depending skirt 25 secured to an adjustable leveling blade 26. An auger 27 is journaled at one end in a side plate 28 and is drivingly engaged at its other end by a drive chain 44 arranged within a side housing 29. Reinforcing ribs 30 and a pair of laterally spaced side plates 31 and 32 are welded to hood 24. The rearward ends of side plates 31 and 32 rotatably mount opposing ends of roller 23.

An accessory in the form of a scraper 33 has a pair of mounting arms 34 and 35 that are pivoted to side plates 31 and 32 respectively at location such that the pivot axis of scraper 33 lies above and substantially vertically aligned with the roller axis 23a. Scraper 23 can be swung upwardly and forwardly to an inactive position and can be actively used in its illustrated position under two different circumstances. The outer ends of mounting arms 34 and 35 are rigidly secured to opposing ends of a web 36, the lower edge of which is joined to a scraper bar 37 and a cutting bar 38 that projects in a direction opposite from that of scraper bar 37. When the grader 10 is being moved forwardly under ordinary conditions then scraper bar 37 may be lowered in order to clean earth and debris from roller 23. In a much different manner when the tractor 11 is traveling in a reverse direction to push the grader 10 rearwardly then the combined surfaces of web 36 and cutting bar 38 constitute an earth moving surface. Instead of roller 23 being forced to travel over a mound of earth or debris, for example, the material can be pushed rearwardly and out of the path of grader 10.

Rigid frame 21 has a pair of laterally spaced and forwardly extending bars 39 and 40 whose rearward ends are welded or otherwise firmly secured to hood 24 and whose forward ends are pivotally secured to members that shall be subsequently described. The power transmission shaft 13 is drivingly engaged through a gear box 41 supported by hood 24 to a substantially perpendicularly aligned rotary screw drive shaft 42. Shaft 42 is spaced above hood 24 and oriented generally parallel to the axis of auger 27. The outer end of shaft 42 is splined or fixed to a sprocket gear 43 around which is trained a drive chain 44 that is also trained around a gear (not shown) secured to auger 27 in order to operate rotary screw 22.

Figure 2:
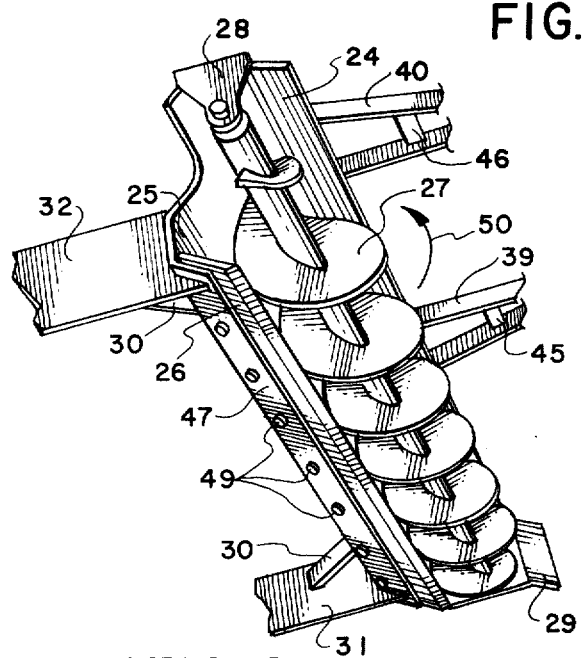
FIG. 2 is a perspective view taken along sight line 2—2 of FIG. 1, showing further details of the rigid frame, rotary screw and leveling blade.

Referring now to FIG. 2 which is an upward view along sight line 2—2 of FIG. 1, a pair of stiffening cross pieces 45 and 46 are arranged between the pairs of forwardly converging members that constitute bars 39 and 40 respectively. Skirt 25 is formed at its lower end with a downwardly and forwardly sloped section 47 in which is formed a series of adjustment slots (not shown). Connectors 49 extending through the slots may be loosened to adjust the relationship between leveling blade 26 and sloped portion 47. As the spiral blade or auger 27 begins to wear and become reduced in size then connectors 49 can be loosened so that the position of leveling blade 26 can be adjusted to correspond with the change. The lower edge of blade 26 lies in the same horizontal plane as the lower flight of auger 27.

Both the upper leading edge of hood 24 and the leveling blade 26 are spaced by only slight gaps from the spiral sections of auger 27. Auger 24 is purposely rotated against the forward travel direction by the grader 10 and in a direction opposite to that of a roller 27 as indicated by directional arrow 50 so that as the earth is cut it will be thrown forwardly in the path of the auger 27 so that the earth accumulations can be carried laterally of the path of motion.

Figure 3:
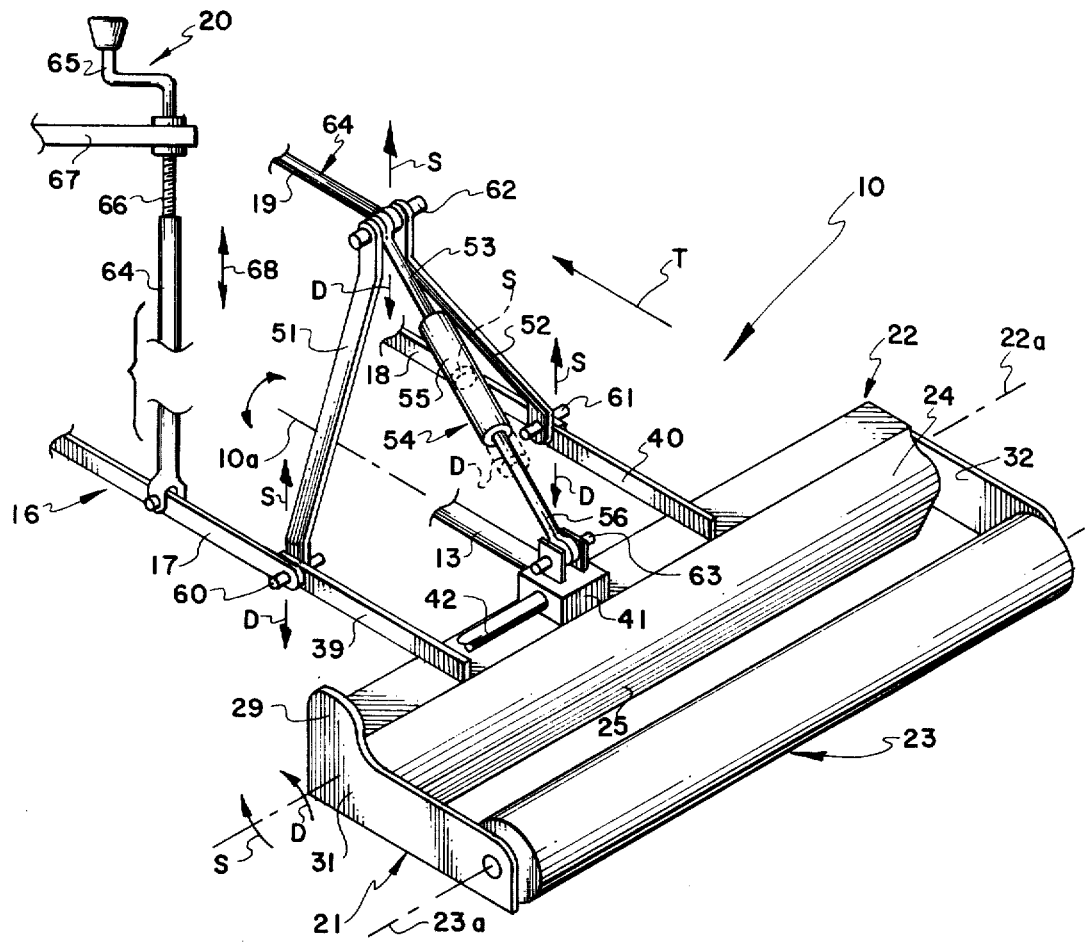
FIG. 3 is a schematic view of the grader illustrating by force arrows S and D how the rotary screw can be urged to cut at shallower and deeper levels respectively.

Referring again to FIG. 1 and also to the schematic view of FIG. 3 the forwardly extending bars 39 and 40 of rigid frame 21 are pivotally secured to the lower ends of a pair of generally diagonally extending bars 51 and 52. Bars 51 and 52 converge upwardly and are pivotally coupled to the upper end of a variable length bar 53 whose lower end is pivotally connected to gear box 41. Variable length bar 53 incorporates a portion of a cutting depth adjustment means 54 shown in the form of a cylinder 55 housing a double acting piston secured to a ram 56. Conventional fluid lines 57 and 58 are coupled to a fluid control 59 and communicate with variable chambers of cylinder 55 located on opposing sides of the double acting piston.

Referring now primarily to FIG. 3, hitch arm 17, rigid frame bar 39 and diagonal bar 51 are coupled together by a pin joint connection 60. Hitch arm 18, rigid frame bar 40 and diagonal bar 52 are coupled together by a pin joint connection 61. Similarly the upper ends of variable length bar 53 and diagonal bars 51 and 52 along with the rearward end of hitch arm 19 are coupled together by a pin joint connection 62. The lower end of variable length bar 53 is secured to the gear box by a pin joint connection 63.

A force transmitting framework 64 is constituted by the three hitch arms 17, 18 and 19, diagonal bars 51 and 52 and variable length bar 53.

A tilt adjusting means 20 is secured to the force transmitting framework 64 and can be operated to tilt the grader 10 sideways about its longitudinal axis 10a. The tilt adjusting means 20 has an internally threaded rod 64 attached to hitch arm 17, and a crank arm 65 with a threaded section 66 that is interengaged with rod 64. A stabilizing plate, bearing or collet 67 mounts a section of crank arm 65 so that rotation of crank arm 65 can selectively move rod 64 up or down as indicated by arrow 68. Upward and downward movement by rod 64 would cause grader 10 to tilt to the right and left of its axis 10a respectively.

The manner in which the cutting depth adjustment means 54 can be operated to raise or lower the cutting depth of rotary screw 22 will now be explained. Variable length bar 53, diagonal bar 51 and bar 39, which is a portion of rigid frame 21, are hinged together at their ends to form a rigid framework that constitutes a structure analogous to a three bar truss. Similarly, bar 53, diagonal bar 52 and bar 40 are also hinged together at their ends to form a substantially rigid framework that constitutes a structure analogous to a three bar truss. These two symmetrical trusses are rigid in that their bar members experience no relative movement except for small elastic deformations unless one of the bar members is axially lengthened or shortened. It will be appreciated that the two symmetrical triangular frameworks are interconnected by a common bar, namely, variable length bar 53 whose length can be changed by operating the depth cutting adjustment means 54.

For purposes of illustration, the letter S and associated force-displacement arrows adjacent pins 60, 61 and 62 and rotation arrow S adjacent screw axis 22a indicate the action that occurs when the tractor operator desires to cut at a relatively shallower depth. Conversely, the letters D and the associated force-displacement arrows adjacent pins 60, 61 and 62 and the rotational arrow indicated by letter D associated with screw axis 22a indicate the action that occurs when the tractor operator desires to operate screw 22 at a deeper level.

By actuating the adjustable cutting depth means 54 the screw 22 experiences upwardly or downwardly directed stress or thrust with respect to the roller 23 that serves as a fulcrum. As the grader 10 continues or commences travel in direction T rotary screw 22 will cut on a downward or upward slope with respect to the tractor path movement T until the stress on the screw 22 is relaxed. The screw 22 then levels off at the predetermined cutting plane and the roller 23 maintains the cutting plane due to its being linked to rotary screw 22 by rigid frame 11 and force transmitting framework 64.

Figure 4:
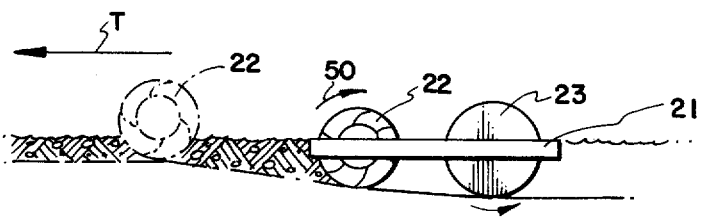
FIG. 4 is a schematic view showing the changed position of the rotary screw when it is moved to a shallower cutting level; and, FIG. 5 is a schematic view showing the rotary screw at a changed position when it is moved to a greater cutting depth.

In order to attain a shallower cut as shown in FIG. 4 the adjustable cutting depth means 54 is operated to extend ram 56 further from the cylinder 55 as indicated. With roller 23 serving as a fulcrum screw axis 22a will become lifted and rotated upwardly relative to roller axis 23a until the new cutting depth is attained. The pivot pins 60, 61 and 62 would likewise be elevated as indicated.

Figure 5:
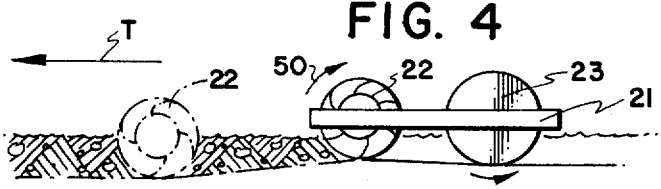

In order to force screw 22 to a deeper cutting depth as shown in FIG. 5, then the adjustable cutting depth means 54 is operated to retract ram 56 into the cylinder 55 as indicated. If the grader 10 is traversing the ground to be leveled, then screw 22 will pitch downwardly along with pivot pins 60, 61 and 62 until a new predetermined cutting plane is attained. Thereafter, roller 23 will travel in the path of screw 22 to maintain the desired cutting depth and automatically smooth over cutting depth irregularities that might otherwise occur.

OPERATION

Keeping the above construction in mind it can be understood how the previously described disadvantages of conventional graders are overcome or substantially eliminated by the present invention.

Assuming that the self-leveling rotary screw grader 10 is hitched to tractor 11 and the gear box 41 is operatively coupled to the tractor power take-off shaft 12 then the person driving the tractor may maneuver grader 10 through various earth removal and leveling operations. With the tractor engine operating and tractor 11 standing still or moving forwardly the person operates the depth cutting adjustment means 20 by manipulating the fluid control 59 and causing the ram 56 to retract into the cylinder 55 by a sufficient distance corresponding to the cut level desired. If tractor 11 is standing still then the rotary screw 22 will chew downwardly to the desired cut level, and, if the tractor 11 is moving forwardly in direction T as shown in FIG. 5 the rotary screw 22 will traverse a downward slope until the desired cut level is established.

The shortening of the variable length bar 53 and resulting deformation in the force transmission framework 64 causes roller 23 to act as a fulcrum as the rigid frame 21 is rocked or tilted downwardly and the rotary screw 22 is pivoted downwardly with respect to the roller axis.

Immediately upon penetrating and cutting into the earth the rotary screw 22 starts to carry or convey the freshly cut earth to one side of the rigid frame 21 so that as the tractor 11 moves forwardly a continuous pile of earth is deposited. The rotary screw 22 turns against the path of movement T of the tractor 11 to toss earth forwardly into its own path so that eventually this earth will be removed to one side. The leveling blade 26 glides over and levels the freshly cut earth and is sufficiently close to auger 27 so that earth is prevented from traveling rearwardly and creating a lumpy or irregular surface.

When roller 23 is eventually pulled over the path of the rotary screw 22 onto the desired cut level then it smooths over the underlying earth and more importantly holds or maintains the rotary screw 22 accurately at the desired cutting level. If, for example, rotary screw 22 encounters a rut or depression then its tendency to drop into it would be prevented due to the fact that roller 23 would be traveling at the desired cut level over freshly cut earth and is joined to rotary screw 22 by way of rigid frame 21.

Scraper 33 would be in a position to continuously remove wet earth or other debris from roller 23.

If the person wished to back up and change direction by a sharp angle then the grader 10 would be maintained at the desired cut level because the scraper web 36 and cutting bar 38 would coact and serve as an earth moving surface analogous to a small bulldozer blade.

When the person wishes to elevate grader 10 to a shallower desired cut level then he manipulates the depth cut adjustment means 54 to lengthen the variable length bar 53 by the necessary amount which corresponds with the new desired cut level. As indicated in FIG. 4 the rotary screw 22 traverses an upwardly inclined slope until it attains the new desired cut level. When roller 23 is pulled to the new level then the grader 10 again becomes self-leveling and since roller 23 with its following action will hold rotary screw 22 at the new cut level.

In order to create a smooth sloped surface in generally level ground then the person may easily manipulate the tilt adjusting means 20. By rotating the crank 65 in one direction the grader 10 may be selectively tilted sideways about its longitudinal axis and if the crank 65 is rotated in the opposite direction then the grader 10 will also tilt about its longitudinal axis in the other direction.

The rotary screw 22 works as a cutting device by shaving off earth in front of it and conveying the earth to one side. The auger 27 of the rotary screw 22 turns against the forward movement of the tractor 11 and the grader in order to lift the earth up so it can be carried sideways. If for example as shown in FIG. 3 the movement of the grader 10 is towards the left as indicated by arrow T then the rotary screw 22 would be turning clockwise.

It will be apparent that the rotational speed of the rotary screw 22 in relationship to the forward speed of the tractor 11 and grader 10 is the limiting factor on the quantity or volume of earth that can be moved sideways at a given depth of cut. When the forward speed of the tractor 11 is greater than the ability by the rotary screw to lift the earth upwardly and sideways then the excess will collect between blade 26 and auger 27 which will coact in moving the excess sideways. In situations where the grader 10 is standing still with the rotary screw 22 in motion then the rotary screw 22 would operate to move material in a lateral direction without any assistance from the leveling blade 26. When the rotational speed of the rotary screw 22 and forward speed of the tractor 11 are satisfactorily set for a given depth of cut then the relatively heavy roller 23 whose length coincides with that of the rotary screw 22 will tend to maintain the position of the grader 10 in order to hold the cut to the desired grade. The roller 23 also packs and smooths the freshly cut earth in order to leave a flat attractive surface.

After the depth of cut is established the grader 10 becomes self-leveling because the following roller 23 simply rides on the existing smoothed earth as the rotary screw 22 continues to shave off or fill in irregularities in the earth that is being traversed by it. Thus after the roller 23 serves as a fulcrum in urging the rotary screw 22 to a new desired cutting depth then the roller holds the overall grader 10 in alignment by simply riding over the smoothed ground. A set of wheels carried on a common axis could replace the roller 23 for achieving the self-leveling action.

From the foregoing it will be evident that the present invention has provided a self-leveling rotary screw grader in which all of the advantages are fully realized.

What is claimed is:

1. A self-leveling rotary screw grader capable of being drawn by a vehicle, the grader comprising:
    a. a rigid frame having a longitudinal axis;
    b. a rotary screw secured to a front section of the rigid frame and having an axis generally perpendicular to the rigid frame longitudinal axis;
    c. depth cutting adjustment means coupled to the rigid frame for selectively controlling the cutting depth of the rotary screw;
    d. a roller secured to a rearward section of the rigid frame behind the rotary screw, the roller being structurally arranged to serve as a fulcrum for urging the rotary screw to a new cutting level when the depth cutting adjustment means is actuated and to thereafter serve as a level maintaining follower when the new cutting level is attained;
    e. a force transmitting framework coupled to the depth cutting adjustment means and arranged to interconnect the rigid frame with a vehicle, the force transmitting framework being arranged to experience deformation upon actuation of the depth control adjustment means to cause the roller to serve as a fulcrum for the rotary screw;
    f. power means for operating the rotary screw and causing it to convey earth laterally to one side of the rigid frame, the power means including a vehicle power take-off shaft operatively coupled to the rotary screw for rotating it in a direction opposite from the rotational direction of the roller;
    g. a scraper blade pivotally connected to a rearward section of the rigid frame, the scraper blade being movable to a position spanning a rearward section of the roller for scraping earth from the roller; and,
    h. tilt adjusting means coupled to the force transmitting framework for selectively tilting the rigid frame sideways about its longitudinal axis.

2. The structure according to claim 1, wherein;
    the force transmitting framework includes a variable length bar coupled to the depth cutting adjustment means in such a manner that the variable-length bar may be selectively shortened or lengthened by the depth cutting adjustment means to vary the cutting level of the rotary screw; and,
    the depth cutting adjustment means includes a double acting fluid cylinder incorporated within the variable length bar and arranged such that when the ram is extended from the cylinder the rotary screw is moved to a shallow cutting depth and when its ram is retracted into the cylinder the rotary screw is moved to a deeper cutting depth.

3. The structure according to claim 1, wherein:
    the rigid frame includes a pair of laterally spaced and forwardly extending bars; and,
    the force transmitting framework includes;
    first and second upwardly converging diagonal bars pivoted by their lower ends to corresponding rigid frame bars to constitute first and second pin joints,
    a third bar pivoted at one end to the rigid frame and to both the first and second bars at its other end to constitute a third pin joint, the third bar being a variable length bar coupled to the depth cutting adjustment means,
    three hitch arms extending forwardly from the first, second and third pin joints respectively for connection to a vehicle,
    wherein when the variable-length bar is lengthened the three pin joints become raised to urge the rotary screw to a shallower cutting depth and when the variable-length bar is shortened the three pin joints become lowered to urge the rotary screw to a deeper cutting depth.

4. The structure according to claim 3, wherein the rigid frame includes:
    a hood enclosing a top and rearward portion of the rotary screw, the hood having a lower rearward portion that mounts a leveling blade whose lower edge can be adjustably positioned to be in the same horizontal plane as the bottom flight of the rotary screw.

5. The structure according to claim 4, wherein:
    a cutting bar is secured to and extends rearwardly from the scraper blade so that when the frame is pushed in a reverse direction the scraper blade and cutting bar operate as an earth moving surface.

* * * * *